(12) United States Patent
Yrjola et al.

(10) Patent No.: US 10,122,428 B2
(45) Date of Patent: Nov. 6, 2018

(54) INTERFERENCE REDUCTION

(71) Applicant: Nokia Solutions and Networks Oy, Espoo (FI)

(72) Inventors: Seppo Ilmari Yrjola, Oulusalo (FI); Eero Olavi Heikkinen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 209 days.

(21) Appl. No.: 15/116,853

(22) PCT Filed: Feb. 4, 2015

(86) PCT No.: PCT/EP2015/052234
§ 371 (c)(1),
(2) Date: Aug. 5, 2016

(87) PCT Pub. No.: WO2015/117975
PCT Pub. Date: Aug. 13, 2015

(65) Prior Publication Data
US 2017/0170888 A1  Jun. 15, 2017

(30) Foreign Application Priority Data

Feb. 6, 2014 (EP) .................................. 14154141

(51) Int. Cl.
*H04B 7/06* (2006.01)
*H04W 16/28* (2009.01)
(Continued)

(52) U.S. Cl.
CPC ......... *H04B 7/0619* (2013.01); *H04B 7/0617* (2013.01); *H04W 16/14* (2013.01); *H04W 16/28* (2013.01); *H04W 74/00* (2013.01)

(58) Field of Classification Search
CPC ... H04B 7/0619; H04B 7/0617; H04W 16/14; H04W 16/28; H04W 74/00
See application file for complete search history.

(56) References Cited

U.S. PATENT DOCUMENTS

| | | | |
|---|---|---|---|
| 2009/0034508 A1* | 2/2009 | Gurney | ........ H04W 16/14 370/351 |
| 2009/0149135 A1* | 6/2009 | Mangold | ........ H04W 16/14 455/77 |

(Continued)

OTHER PUBLICATIONS

Forge, Simon, et al., "Perspectives on the value of shared spectrum access", Final Report for the European Commission, Feb. 2012, 212 pgs.

(Continued)

*Primary Examiner* — Jackie Zuniga Abad
*Assistant Examiner* — Latresa McCallum
(74) *Attorney, Agent, or Firm* — Harrington & Smith (57) ABSTRACT

There is provided a method, including obtaining, by a network apparatus, antenna sensing information with respect to signals received by a base station operating under a shared access-system which allows a licensee system to apply at least a part of an shared access spectrum which is currently unused by an incumbent system; detecting, on the basis of the antenna sensing information, that at least one device of the incumbent system is communicating on the shared access spectrum in the coverage area of the base station; identifying the angular sector in which the device of the incumbent system is located with respect to the base station; and dynamically isolating the identified angular sector from usage by the licensee system.

20 Claims, 6 Drawing Sheets

(51) Int. Cl.
*H04W 16/14* (2009.01)
*H04W 74/00* (2009.01)

(56) References Cited

U.S. PATENT DOCUMENTS

| | | | | |
|---|---|---|---|---|
| 2009/0197627 | A1* | 8/2009 | Kuffner | H04W 16/14 |
| | | | | 455/522 |
| 2009/0296663 | A1* | 12/2009 | Wild | H01Q 1/246 |
| | | | | 370/335 |
| 2010/0304680 | A1* | 12/2010 | Kuffner | H04B 7/10 |
| | | | | 455/63.1 |
| 2013/0295946 | A1* | 11/2013 | Panchal | H04W 16/14 |
| | | | | 455/452.1 |
| 2014/0011509 | A1 | 1/2014 | Markwart et al. | 455/452.1 |
| 2014/0162617 | A1* | 6/2014 | Mueck | H04W 8/245 |
| | | | | 455/418 |
| 2014/0315561 | A1* | 10/2014 | Hooli | H04W 16/14 |
| | | | | 455/450 |

OTHER PUBLICATIONS

Yrjola, Seppo, et al., "Active Antenna System enhancement for supporting Licenses Shared Access (LSA) concept", © 2014 ICST, 8 pgs.

Martinmikko, Marja, "Spectrum sharing for mobile networks: Trials, Business aspects and regulation", Oct. 9, 2013, 19 pgs.

* cited by examiner

INTERFERENCE REDUCTION

FIELD OF THE INVENTION

The invention relates generally to interference reduction in a mobile telecommunication system. More particularly, the invention relates to interference reduction in an authorized shared access scenario.

BACKGROUND

Mobile data traffic is growing exponentially. With the ever increasing number of mobile devices consuming higher data rates, current mobile communication networks may get congested. This may further result in service disruptions. Despite of improvements in technology and deployments with long-term evolution (LTE) networks, increasing traffic demand may no longer be successfully satisfied with the existing frequency bands dedicated for the networks.

BRIEF DESCRIPTION OF THE INVENTION

According to an aspect of the invention, there is provided a method as specified in claim 1.

According to an aspect of the invention, there is provided an apparatus as specified in claim 14.

According to an aspect of the invention, there is provided a computer program product as specified in claim 15.

According to an aspect of the invention, there is provided a computer-readable distribution medium carrying the above-mentioned computer program product.

According to an aspect of the invention, there is provided an apparatus comprising means for performing any of the embodiments as described in the appended claims.

According to an aspect of the invention, there is provided an apparatus, comprising at least one processor and at least one memory including a computer program code, wherein the at least one memory and the computer program code are configured, with the at least one processor, to cause the apparatus to perform operations comprising: obtaining antenna sensing information with respect to signals received by a base station operating under a shared access-system which allows a licensee system to apply at least a part of a shared access spectrum which is currently unused by an incumbent system; detecting, on the basis of the antenna sensing information, that at least one device of the incumbent system is communicating on the shared access spectrum in the coverage area of the base station; identifying the angular sector in which the device of the incumbent system is located with respect to the base station; and dynamically isolating the identified angular sector from usage by the licensee system.

According to an aspect of the invention, the apparatus is further caused to perform the following: identifying the angular sector on the basis of physical orientation information of each antenna group of the base station, wherein the antenna sensing information comprises antenna group-specific information and the identified angular sector correspond to a cell of the base station.

According to an aspect of the invention, the apparatus is further caused to perform the following: identifying the angular sector within a cell of the base station on the basis of phase information comprised in the antenna sensing information, wherein the phase information indicates a phase of the received signal with respect to a plurality of antenna elements of the base station.

According to an aspect of the invention, the identified angular sector is defined horizontally and vertically as a part of the cell of the base station, and the apparatus is further caused to perform the following: dynamically isolating only that part of the cell from usage by the licensee system, thereby restraining from shutting the entire cell of the base station from the licensee system.

According to an aspect of the invention, the apparatus is further caused to perform the following: detecting, on the basis of the antenna sensing information, at least one characteristic of a received signal; and detecting, on the basis of the detected at least one characteristic, that the received signal is transmitted by a device of the incumbent system.

According to an aspect of the invention, the apparatus is further caused to perform the following: detecting that the base station is communicating with at least one device of the licensee system on the shared access spectrum in the identified angular sector; and causing the base station to cease the communication with the at least one device of the licensee system on the shared access spectrum in the identified angular sector in order to protect the incumbent system from interference.

According to an aspect of the invention, the apparatus is further caused to perform the following: detecting that a device of the licensee system is requesting an access to the shared access spectrum from the identified angular sector; and preventing the device of the licensee system from accessing the shared access spectrum from the identified angular sector.

According to an aspect of the invention, the base station is performing communication on a first sub-band of the shared access spectrum, and the apparatus is further caused to perform the following: configuring the base station to collect the antenna sensing information with respect to a second sub-band of the shared access spectrum; and acquiring the antenna sensing information with respect to the second sub-band which is different than the first sub-band.

According to an aspect of the invention, the apparatus is further caused to perform the following: detecting, on the basis of the antenna sensing information of the second sub-band, that the second sub-band is not used by the incumbent system; and deciding to transmit an indication to the licensee system, wherein the indication indicates that the second sub-band is accessed by the licensee system.

According to an aspect of the invention, the base station comprises active antenna system including radio frequency components integrated with the antenna elements of the base station so that the phase and amplitude of signals to/from each antenna element of the active antenna system is electronically controllable.

According to an aspect of the invention, the base station comprises at least one transmission pre-distortion feedback unit and the apparatus is further caused to perform the following: reconfiguring the base station to apply the at least one transmission pre-distortion feedback unit in collecting the antenna sensing information with respect to the signals received by the base station.

According to an aspect of the invention, the apparatus is further caused to perform the following: reconfiguring the base station to apply the at least one transmission pre-distortion feedback unit in collecting the antenna sensing information on an out-of-current reception band of the base station.

According to an aspect of the invention, the shared access-technique is according to the Licensed Shared Access/Authorised Shared Access, LSA/ASA.

Embodiments of the invention are defined in the dependent claims.

LIST OF THE DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (WCDMA), high-speed packet access (HSPA), Long Term Evolution (LTE), LTE-Advanced, and/or 5G system.

As said, the demand for data traffic is ever-increasing and to guarantee reliable availability of mobile services in the future, mobile network operators (MNO) need new frequency bands and to utilize the frequency spectrum more efficiently. This is challenging as the best frequency bands for mobile communications already encompass other types of wireless traffic, such as military, satellite and broadcasting, and program distribution. One solution to respond to the increasing demand is to share certain frequency bands between existing, incumbent systems and mobile communication networks, while protecting incumbents' usage rights. This may be accomplished by defining and agreeing a set of rules and conditions for sharing between the incumbent and the new entrant(s). This approach is introduced by a Licensed Shared Access (LSA) regulatory framework. An Authorised Shared Access (ASA) concept is a special case under the LSA framework to allow mobile communication networks (e.g. the LTE) to share frequency bands with the incumbent system(s), while guaranteeing that the users of the incumbent spectrum remain free from harmful interference.

An example band for LSA/ASA may be around 2.3 GHz. As an example, the mobile communication networks may be based on a time-division duplexing (TDD) LTE, which may efficiently balance the uplink and downlink traffic on a single frequency band leading to increased efficiency and flexibility without the need for paired bands as in frequency division duplexing (FDD) mode. However, the FDD mode is applicable to the embodiments as well. Further, although the embodiments are described by using the LSA/ASA as an example, the embodiments are suitable also for other shared access technologies.

Figure 1:
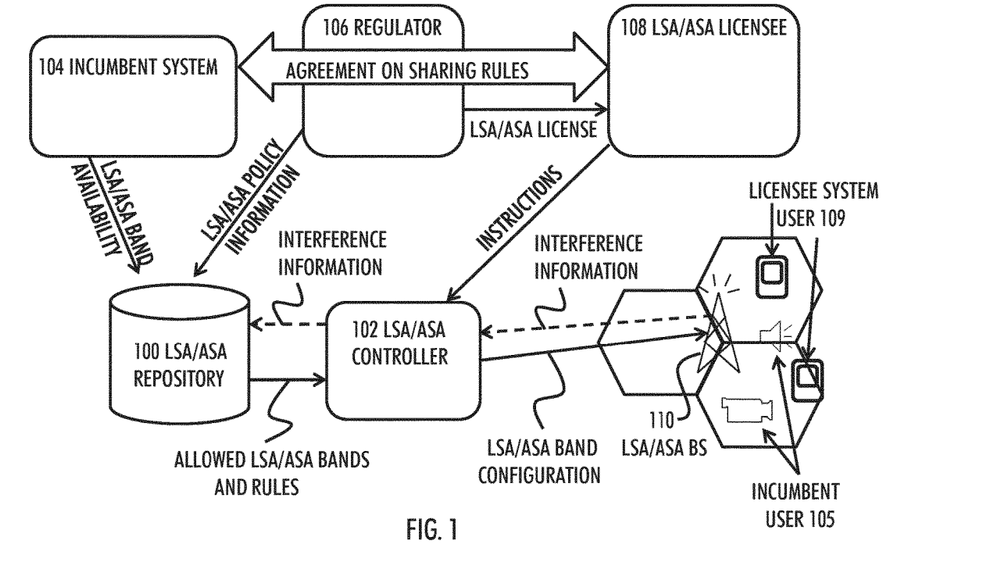
FIG. 1 presents an authorized shared access system, according to an embodiment.

The LSA/ASA system/concept is illustrated in FIG. 1. The LSA/ASA type of sharing is technically feasible with the existing infrastructure and a minimum number of new components. These components may be an LSA/ASA repository 100 and an LSA/ASA controller 102. The LSA/ASA concept may further include an incumbent 104, a regulator 106 and an LSA/ASA licensee 108 (e.g. the mobile network operator, MNO). The incumbent 104 may report available (i.e. unused by the incumbent 104) LSA/ASA bands to the LSA/ASA repository 100. The regulator 106 may then issue an LSA/ASA license to the licensee system 108 and define sharing policies to the LSA/ASA repository 100. The MNO 108 may thus obtain knowledge of the allowed LSA/ASA bands and established conditions and may instruct and use the LSA/ASA controller 102 to configure MNO's 108 network (e.g. the base station 110) to the to-be-used LSA/ASA band. This configuration may comprise configuring the base station (e.g. eNB) 110 to perform communication for the LSA/ASA licensee 108 only according to the allowed LSA/ASA bands and established conditions.

With the access to LSA/ASA frequency bands, MNOs 108 may support the increasing traffic demand in a cost-efficient way by building additional cell layers in areas with high traffic demand by exploiting existing base station (BS) sites 110. For operators with smaller amount of existing frequency bands, access to new bands may open up new business opportunities. For end users, increased capacity and less network congestions improves the quality of mobile services.

The LSA/ASA concept differs from the unlicensed or the white space concepts in that, in the LAS/ASA, at a given point of time, there is a primary user system occupying the spectrum alone. In this sense LSA/ASA is a binary system. On the contrary, in the white space concepts, there may be a primary user and a secondary user simultaneously applying the spectrum.

The following shows some terminology used in the LSA concept:

Sharing Framework: a set of specific rules, licenses, and/or agreements established under the responsibility of the Administration, and which characterize an LSA regime in a particular administration;

LSA System: a system that enables and/or facilitates the realization of an LSA framework. The LSA System includes means to enable coordination of resource usage between incumbents and LSA licensees;

LSA resource: assigned resource with limitation in time, space and frequency domains;

Semi-static sharing: sharing arrangement that is time dependent but where its dynamics are constrained in a pre-defined manner (e.g. there is a finite set of possible combinations of space/frequency usage for the different sharing services);

Static sharing: sharing arrangement that is not time dependent (each service has uninterrupted rights of use to a certain band or sub-band in a given area);

Incumbent: an incumbent is a "current holder of spectrum rights of use". Incumbents may be distinguished depending on the type of rights of use (e.g. military);

LSA Licensee: the LSA Licensee operates a MFCN and would share a LSA spectrum resource with the Incumbent. As a prerequisite the LSA Licensee needs to obtain a LSA spectrum usage license, granted by the Administration/Regulator, and a sharing agreement, i.e. a contract negotiated between the Incumbent and the LSA Licensee, that specifies the LSA spectrum sharing conditions;

LSA Repository: Stores and manages Sharing Framework, Regulator rules, Incumbent-LSA Licensee rules, LSA Resources;

LSA Controller: Part of the MNO (LSA Licensee) network;

Spectrum Manager: used in dynamic sharing scenarios. Not necessarily required in the static and semi-static sharing scenarios.

License Area of Incumbent: Area where the Incumbent owns the spectrum;

LSA License Area: Location Area where the Incumbent shares LSA spectrum with a LSA Licensee, typically defined in Incumbent-LSA Licensee Agreement;

LSA Exclusion Area: Location area where the LSA Licensee is not allowed to use the LSA spectrum, LSA Exclusion Areas may be defined by Regulator or Incumbent;

LSA Reservation Area: Location area where the LSA spectrum is either used by the Incumbent or the LSA Licensee exclusively. The availability of the LSA spectrum in the LSA Reservation Area is steered (controlled) by the Incumbent; and Incumbent-LSA Licensee Agreement: Defines the shared LSA Resources and usage conditions (rules).

Let us further take a look at what the taking the LSA/ASA spectrum into use may comprise. At the appropriate time indicated by the LSA/ASA controller 102, the MNO's 108 operation and maintenance (OAM) system may instruct the relevant base station 110 to enable transmission on the LSA/ASA band. Existing load balancing & traffic steering algorithms in the radio access network (RAN) may make use of the newly available resources and transfer licensee system devices 109 to the new band based on need. Such transferring of the devices 109 may be achieved by using different techniques depending on the considered technology. It is worthwhile noting that none of these techniques are mutually exclusive—the MNO may choose to use any of the techniques simultaneously. Some of these techniques comprise:

Reselection procedures: The RAN starts advertising the LSA/ASA frequency as part of the broadcasted system information and as user terminals 109 in idle mode migrate in and out of the coverage area of the LSA/ASA frequency spectrum, they may start populating the LSA/ASA frequency. This technique may not require any extra signalling, which may be efficient from the point of view of not increasing the amount of overhead.

Inter-Frequency handover procedures: The RAN initiates handover procedures to transfer user terminals 109 in connected mode currently under a licensed band towards the LSA/ASA band. This procedure is under the control of the network and hence it may be faster than the reselection procedure.

Carrier Aggregation procedure: The RAN may reconfigure appropriate user terminals 109 (terminals supporting carrier aggregation between the current licensed band and the LSA/ASA band) in order to start operating in a Carrier Aggregation mode. This procedure is under the control of the network hence it may be fast and it may also be robust because the user terminal 109 does not change its underlying operating band.

However, one characteristic of the LSA/ASA is that, according to the agreement between the incumbent system 104 and the LSA/ASA licensee 108, the incumbent system 104 may request specific LSA/ASA resources for its own usage. Such request may be defined by static rules (e.g. a defined exclusion zone and/or time where the spectrum is used by the incumbent system 104, as stored in the LSA/ASA repository 100, for example) or dynamic rules (e.g. as a response to a request from the incumbent system 104). In both cases, zones, where spectrum use under the LSA/ASA is not allowed, may be defined by geographical area, time and/or transmitter/receiver characteristics. Therefore, the licensee users 109 may need to leave the LSA/ASA spectrum. Such vacating of the LSA/ASA spectrum may require that when the granted time period for the operation in the LSA/ASA band expires, the RAN of the MNO 108 may be responsible for ensuring that devices 109 are transferred back to the dedicated, licensed band or to perform, e.g., WiFi offloading. Transferring the devices 109 may take the following forms (again LTE is assumed to be the technology in use, for simplicity reasons):

Reselection procedures: The RAN bars the LSA/ASA frequency in the broadcasted system information and as user terminals 109 periodically check the system information, they may start vacating the frequency.

Inter-Frequency Handover procedures: The RAN initiates handover procedures to transfer user terminals 109 in connected mode back to the underlying licensed band.

Carrier Aggregation procedure: The RAN reconfigures appropriate user terminals 109 to stop operating in a Carrier Aggregation mode. The user terminal 109 continues its normal operation within the underlying licensed band.

Additionally, evacuation of the LSA/ASA band on ad-hoc request from the incumbent 104, e.g., for emergency situations, may take place by an administrative entity turning off cell's radio through immediate cell shutdown or by a base station graceful cell shutdown. Such cell barring means that the licensee system user terminals 109 are not allowed to camp on the cell 300. In an embodiment, this means no access by the licensee system users 109, not even for emergency calls. If an active cell is barred, a cell reselection for existing terminals may be triggered. On the other hand, handover blacklisting enables to define cells where active mode mobility handovers should not be done. As further means, the base station's maximum output power may be limited or a limit may be set to the maximum UE transmit power.

These available features for vacating/evacuation of the LSA/ASA band may result in the shutdown of the whole cell or heavily reduced cell size leading to total or severe LSA/ASA capacity loss for the mobile operator 108. This may not be desired. Moreover, although the static sharing agreement and rules define, to some extent, how the licensee system 104 is allowed to utilize the LSA/ASA spectrum, it may problematic to solely rely on static rules stored in the LSA/ASA repository 100 or to requests obtained from the incumbent system 104 via the LSA/ASA system.

Figure 2:
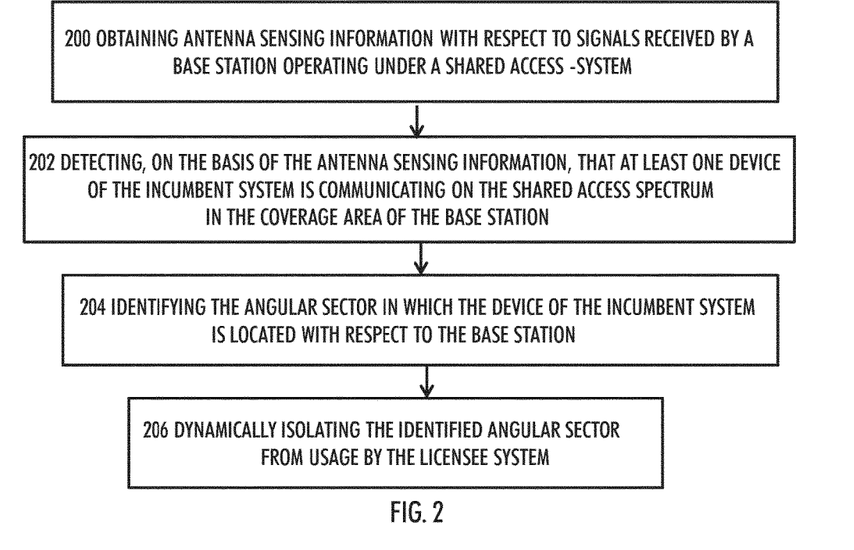
FIG. 2 shows a method according to an embodiment.

Therefore, it is proposed, as shown in FIG. 2, to obtain in step 200, by a network apparatus/element, antenna sensing information with respect to signals received by the base station 110 operating under the LSA/ASA system which allows the licensee system (e.g. LSA/ASA licensee) 108 to apply at least a part of the LSA/ASA spectrum which is currently unused by the incumbent system 104. In an embodiment the incumbent system 104 may be called a primary system and the licensee system 108 may be called a secondary system. The network apparatus may be, for example, an element/unit of the base station 110, or the LSA/ASA controller 102, depending on the implementation of the system. The antenna sensing information may be collected with the antennas of the base station 110 by listening to signals receivable by the base station 100. This information thus efficiently indicates have any signals been transmitted by devices on the coverage area of the base station 110.

In an embodiment, the incumbent system user 105 may be a program making cordless camera, a wireless microphone, an emergency system, etc. In Figures, the incumbent system users 105 are illustrated with a camera recorder and a speaker, for example. In an embodiment, the licensee system may correspond to a cellular system under which several different cellular devices may communicate. These devices may include cellular mobile phones, laptops, tablet computers, smart phones, wrist watches, etc. For simplicity, the licensee system users 109 are illustrate, e.g., with a mobile phone in the figures.

In step 202 the BS 110 may detect, on the basis of the antenna sensing information, that at least one device of the incumbent system 104 is communicating on the LSA/ASA spectrum in the coverage area of the base station 110. The coverage area of the BS 110 is illustrated in FIG. 1 with three cells, each representing, as a non-limiting example, an angular sector of 120 degrees. Thus, the BS 110 may listen to wireless signals from each of the three cells which together define the coverage area of the BS 110. The antenna sensing information may be collected on the LSA/ASA spectrum, which defines the operating band of the LSA/ASA system. An example band may be 100 MHz. The operating LSA/ASA band may be centred around 2.3 GHz, for example.

In an embodiment, the antenna sensing information may further indicate that there is licensee system communication taking place in the coverage area of the base station 110. Communication of the licensee system 108 may be allowed as long as there is no incumbent system communication taking place. However, if the incumbent system 104 is communicating under the coverage area of the base station 110, then the communication of the licensee system 108 may interfere with the incumbent, incumbent system 104, and this is neither allowed nor desired in the LSA/ASA system. Advantageously the antenna sensing information may indicate whether or not the incumbent system 104 is performing communication in the coverage area of the BS 110.

Whether the detected signals by the BS 110 is received from the incumbent system user 105 or from the licensee system user 109 may be identified in various manners. In an embodiment, as the BS 110 is a base station of the licensee system, the BS 110 may know when the licensee users are scheduled to transmit. In an embodiment, the network apparatus may detect, on the basis of the antenna sensing information, at least one characteristic of a received signal. The characteristic may include at least one the following: frequency spectrum of the signal, applied modulation and/or coding of the received signal, type and/or content of a part (e.g. header) of the received signal, and priority class of the signal, identifier of the transmitting device. Then the network apparatus may detect, on the basis of the detected at least one characteristic, that the received signal is transmitted by a device 105 of the incumbent system 104. This is because, e.g., the modulation and/or coding applied by the licensee system 108 may differ from the modulation applied by the incumbent system 104. Similarly, the frequency spectrum of the signal may be different between signals originating from these two systems 104, 108. In an embodiment, the network apparatus may have been pre-informed of the characteristic which are indicative of a signal originating from the incumbent system 104 and/or from the licensee system 108.

In step 204, the network apparatus may identify the angular sector 302 in which the device 105 of the incumbent system 104 is located with respect to the base station 110, and in step 206, dynamically isolate the identified angular sector 302 from usage by the licensee system 108. FIGS. 3 and 4 show some examples of these steps.

Figures 3A, 3B:
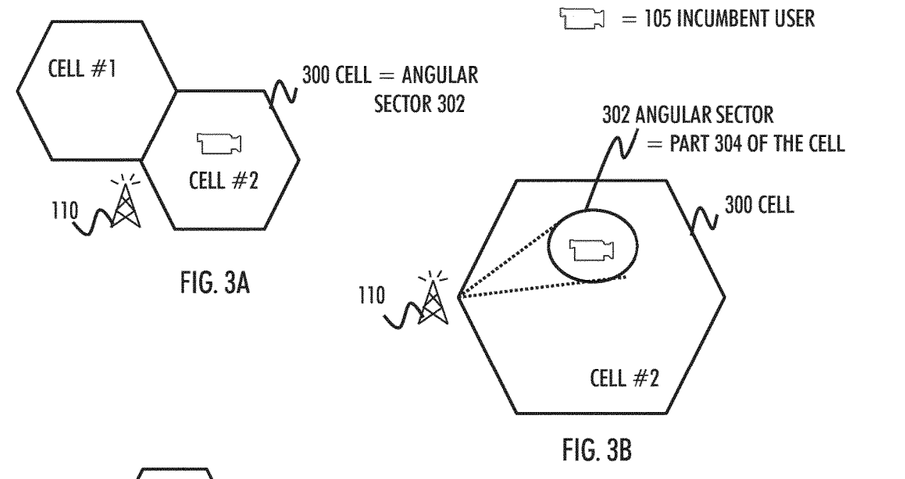
FIGS. 3A and 3B show some embodiments on defining an angular sector in which an incumbent system user is detected to locate.
Figure 4A:
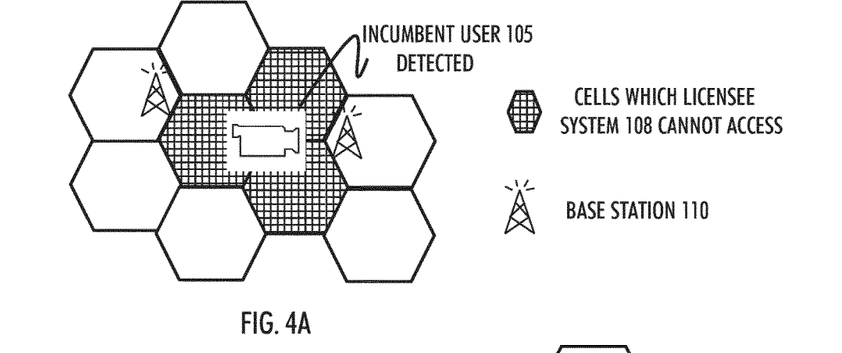
FIGS. 4A and 4B illustrate some embodiments on isolating the angular sector from usage by a licensee system.

In an embodiment shown in FIGS. 3A and 4A, the network apparatus may identify the angular sector 302 on the basis of physical orientation information of each antenna group of the base station 110. It may be noted that one antenna group comprising one or more antenna elements (i.e. radiating elements) may be oriented in a certain direction, whereas another antenna group is oriented to a different direction. This may be the case, e.g., when the base station 110 provides three cells, each with a dedicated antenna group and each cell having 120 degrees angular sector, or 6 cells, each having 60 degrees angular sector, to mention a few non-limiting examples. The antenna sensing information may comprise antenna group-specific information so that the network apparatus becomes aware of which antenna group has detected signal(s) from the incumbent user 104. For example, the network apparatus may determine, on the basis of the antenna sensing information, that the signal is received by the antenna group #2 oriented towards cell #2, as shown in FIG. 3A. Then it may be determined that the incumbent user 105 is in the cell #2. In this example, the angular sector 302 may correspond to the cell 300 (e.g. the cell #2) of the base station 110. This embodiment may provide a quick and a non-complex manner of determining the angular sector 302 at a cell-accuracy level.

In an embodiment, as the network apparatus detects the angular sector of the incumbent system user 105 (also known as an interferer from the point of view of the licensee system 108), the network apparatus may transmit interference information to the LSA/ASA repository 100, so that the repository 100 may update the information regarding the existing allowed LSA/ASA bands for the licensee system 108, as shown in FIG. 1. As explained earlier, the LSA/ASA repository 100 comprises information regarding static sharing rules of the LSA/ASA spectrum to the licensee system 108. However, the detection of the incumbent user 105 in FIGS. 3A and 3B may be unexpected and dynamic so that it may be advisable to update the information stored in the LSA/ASA repository 100 with this dynamic information.

In an embodiment, the LSA/ASA controller 102 may dynamically configure the base station 110 to isolate the identified angular sector 302 from usage by the licensee system 108. By dynamic it is meant that the configurations of the base station 110 with respect to the usage of the LSA/ASA spectrum by the licensee system 108 may change in real time depending on where the incumbent system users 105 are active.

In case an element of the base station 110 is the network apparatus performing the steps of FIG. 2, then the base station 110 may configure itself to isolate the cell 300 from the licensee system 108. In case the LSA/ASA controller 102 is the network apparatus performing the steps of FIG. 2, then the LSA/ASA controller may configure the base station 110 to isolate the cell 300 from the licensee system 108.

As a result, as shown in FIG. 4A, the network apparatus may configure the base station 110 to switch off this cell 300 (or all cells that are affected by the presence of the primary user 105) from usage by the licensee system 108. Such measures may be realised by knowing the location and characteristics of each base station 110 and associations between the cells and the antenna groups of the base stations 110. In this way interference free operation of the incumbent system 104 is guaranteed.

Figure 4B:
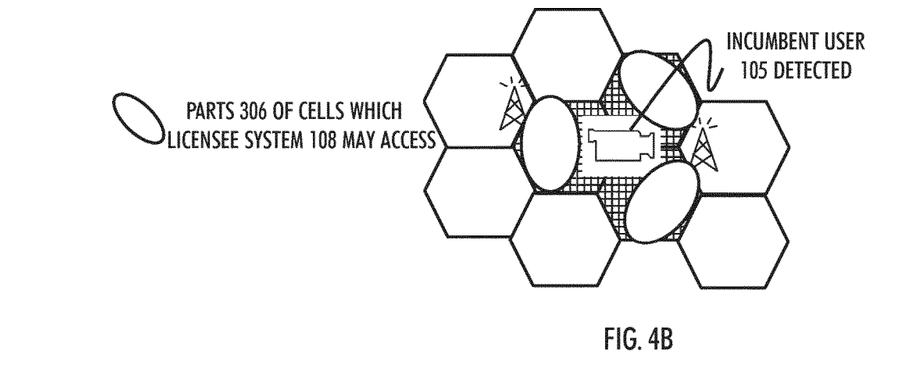

However, in some cases closing the entire cell 300 from the licensee system 108 may too harsh and cause unnecessary drop in the communication efficiency of the system. Therefore, in an embodiment, as shown in FIGS. 3B and 4B, the network apparatus may identify the angular sector 302 within the cell 300 (e.g. within the cell #2) of the base station 110 on the basis of phase information comprised in the antenna sensing information. In other words, the network apparatus may apply this information as reception beamforming information so that the direction where the signal was received by the BS 110 is obtained. The phase information may indicate a phase of the received signal with respect to a plurality of antenna elements of the base station 110. In an embodiment, the phase information may be given with respect to each of the plurality of antenna elements of the base station 110. In addition, in an embodiment, delay and amplitude information corresponding to the phase information may be obtained from each of the antenna elements. As said, each antenna group of the BS 100 may comprise many antenna elements. These antenna elements may be used in beam forming—technique to indicate the reception direction of the received signal(s), or in transmission beamforming to transmit data only to a desired direction. As a result, owing to the phase information of the antenna elements, the location of the incumbent user 105 may be more accurate and flexible than in the case of FIG. 3A. For example, the identified angular sector 302 may be defined horizontally and vertically as a part 304 of the cell 300 (e.g. the cell #2) of the base station 110.

As a consequence, as shown in FIG. 4B, the entire cell(s) 300 need not be isolated, but the network apparatus may configure the BS 110 to dynamically isolate only the part 304 of the cell 300 from usage by the licensee system 108. Thus this approach avoids shutting the entire cell 300 of the base station 110 from the licensee system 108. The part 304 of the cell(s) where the incumbent system user 105 is located is still free from interference. However, advantageously the licensee system 108 may still be active in other parts 306 of the cell(s) which may be beneficial from the point of view of the licensee system's 108 communication efficiency. Such partial isolation and partial usage of the cell 300 may be achieved by performing transmission/reception beamforming with respect to the licensee system 108, as will be described.

It may be noted that in an embodiment the network apparatus may further acquire information of static exclusion areas and times during which the licensee system 108 is not allowed to communicate on an indicated part of the LSA/ASA spectrum. Such information may be obtained from a database entity of the LSA/ASA system (e.g. the LSA/ASA repository 100). The network apparatus may then prevent the licensee system 108 from accessing the indicated part of the LSA/ASA spectrum during the indicated time in the indicated area.

However, the LSA/ASA radio access networks may necessitate a need for semi-static or dynamic configurations of the spectrum resource. Although the static rules of the LSA/ASA repository 100 may indicate the usage of the LSA/ASA spectrum by the incumbent system 104 to some extent, it may not describe any ad-hoc use of the LSA/ASA spectrum by the incumbent system 104. An example of such situations may comprise emergency situations, for example. This is because the LSA/ASA spectrum needs to be both taken into use and, in particular, evacuated according to predefined terms and conditions if requested by the incumbent 104. Thus, occasionally, in some regions and time, certain parts of the spectrum may no longer be exclusively assigned to a single operator 108. Instead the spectrum may need to be evacuated by the MNO 108 or collectively used with another system.

Nevertheless, it may still be important that the incumbent system 104 broadcasting the emergency information, for example, is able to operate in an interference-free environment even if the incumbent system 104 is breaking the established rules. Therefore, it may be beneficial to listen to the incumbent system 104 on the LSA/ASA spectrum in the coverage area of the BS 110 so that ad-hoc usage of the LSA/ASA spectrum by the incumbents 105 is detected.

It may be also noted that in an embodiment the BS 110 is operating under the licensee system 108 (e.g. the MNO) but it may still perform monitoring of the radio activity of a different system, namely the incumbent system 104. Owing to such advantageous sensing behaviour of another system by the BS 110, it may be possible to detect the dynamic usage of the LSA/ASA spectrum by the incumbent system 104. Consequently, the network apparatus may prevent the licensee system 108 from accessing the LSA/ASA spectrum at least in the identified angular sector 302 or evacuate the current licensee system users 109 from the LSA/ASA spectrum at least in that identified angular sector 302.

Figure 5A:
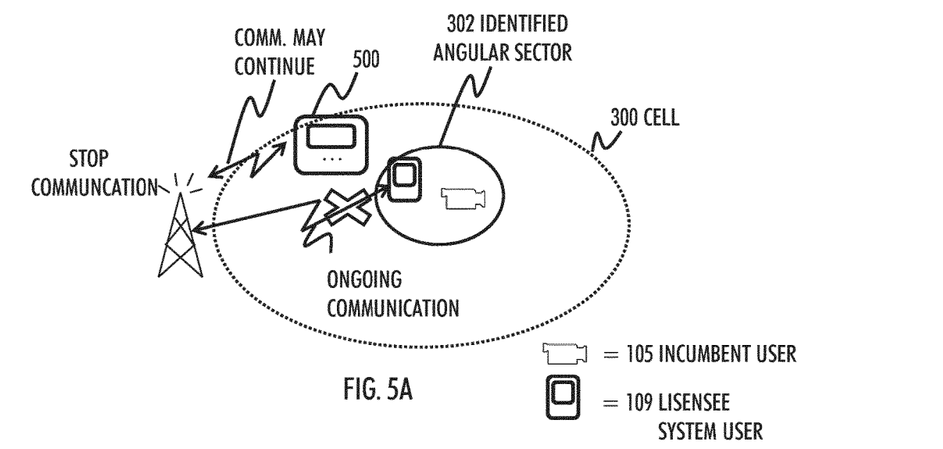
FIGS. 5A to 5B show some embodiments on how to react upon detecting that the incumbent system user is located in the angular sector.
Figure 5B:
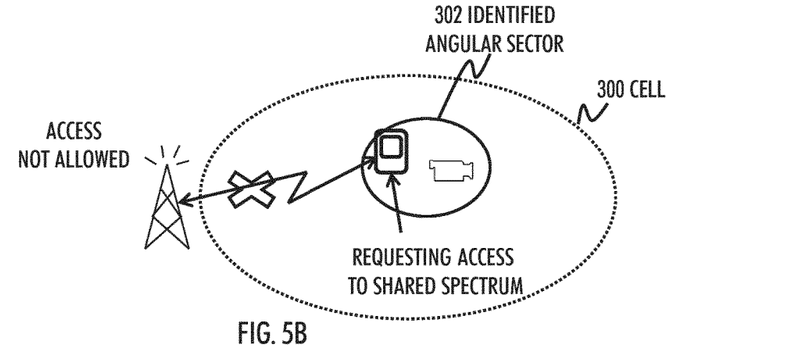

Let us next take a look at FIGS. 5A to 5C which show some embodiments regarding actions made by the network apparatus as a result of detecting the incumbent system user 105 on the LSA/ASA spectrum.

In FIG. 5A it is detected that the base station 110 is currently communicating with at least one device 109 (marked with cellular phone-image) of the licensee system 108 on the LSA/ASA spectrum in the identified angular sector 302. As a consequence, the network apparatus may cause the base station 110 to cease the communication with the at least one device of the licensee system 108 on the LSA/ASA spectrum in the identified angular sector 302 in order to protect the incumbent system 104 from interference. This is illustrated with a cross on top of the ongoing communication link between the BS 110 and the licensee system user 109. However, owing to the partial isolation of the cell 300 from the usage of the licensee system 108, communication between the BS 110 and the other device 500 of the licensee system 108, which is not locating in the identified angular sector 302, may continue. This is because use of passive directive antennas or beamforming towards the device 500 may enable communication with the device 500 without causing interference to the identified angular sector 302. There may also be guard bands or thresholds defined which the network apparatus may obtain from the LSA/ASA repository 100 and take into account while configuring the base station 110 to operate with the allowed devices 500.

In an embodiment illustrated in FIG. 5B, the network apparatus detects that a device of the licensee system 108 is requesting an access to the LSA/ASA spectrum from the identified angular sector 302. That is there may not be any ongoing communication on the LSA/ASA spectrum in the identified angular sector 302 but there may be a licensee system user 109 requesting an access to the spectrum (e.g. requests to communicate through the LSA/ASA BS 110). As the incumbent user 105 is active in the angular sector 302, the network apparatus may prevent the licensee system device 109 from accessing the LSA/ASA spectrum from the identified angular sector 302 in order to protect the incumbent system 104 from interference. This is shown with a cross on top of the link between the BS 110 and the licensee system device 109.

Figure 9A:
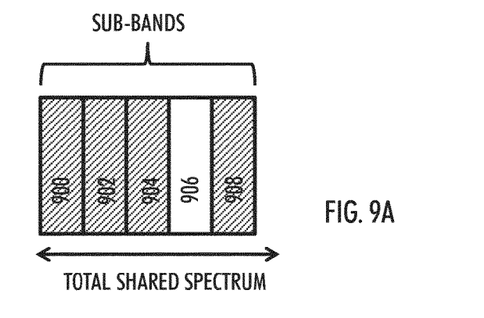
FIGS. 9A to 9C show an embodiment on sensing a sub-band other than the one where the base station is currently operating.
Figure 9B:
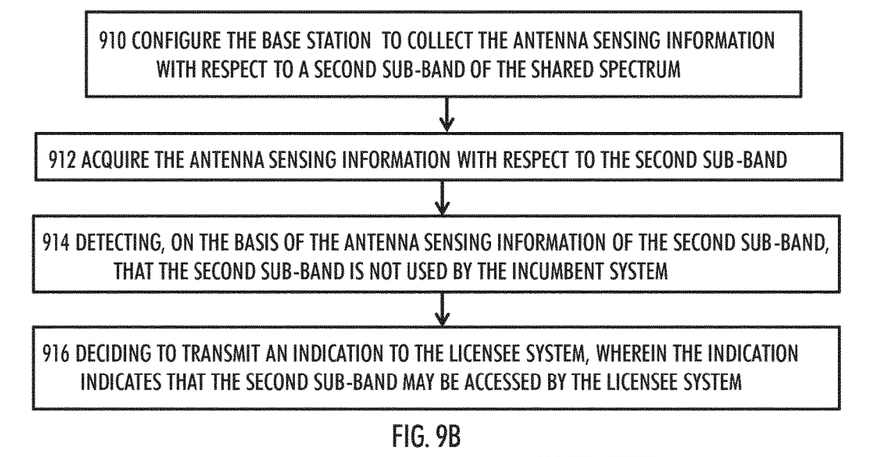
Figure 9C:
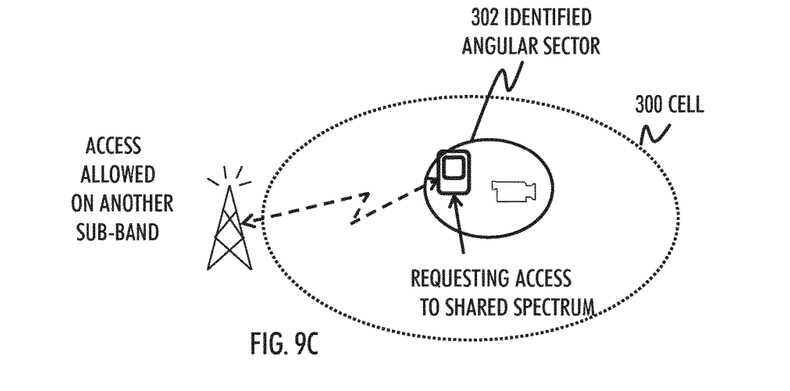

Let us then take a look at an embodiment in which the incumbent system 104 is performing communication on a first sub-band of the LSA/ASA spectrum. This is illustrated in FIGS. 9A to 9C. FIG. 9C shows that, likewise FIG. 5B, the licensee user 109 may be requesting access to the LSA/ASA band.

FIG. 9A shows five different sub-bands 900-908 within the LSA/ASA spectrum. For example, each sub-band may occupy 20 MHz, whereas the overall LSA/ASA spectrum comprises 100 MHz of frequency range. Let us assume that antenna sensing information indicates that the incumbent user 105 is communicating on the sub-band 906, which is referred to as the first sub-band, as illustrated with white color in that sub-band 906.

As shown in FIG. 9B, the network apparatus may in step 910 configure the base station 110 to collect the antenna sensing information with respect to a second sub-band of the LSA/ASA spectrum. This second sub-band may be any of the other sub-bands 900-904, 908, as long as it is not the first sub-band 906 within which the incumbent system 104 is currently operating. Let us assume that the second sub-band is the band 904. The network apparatus may then, in step 912, acquire the antenna sensing information with respect to the second sub-band 904.

In an embodiment, the network apparatus may, in step 914 on the basis of the antenna sensing information corresponding to the second sub-band 904, detect that the second sub-band 904 is not used by the incumbent system 104. Therefore, this non-used part 904 of the LSA/ASA spectrum may be available for the licensee system 108 without interfering the incumbent system 104 operating on another sub-band 906 of the LSA/ASA spectrum. As a result, the network apparatus may, in step 916, decide to transmit an indication to the licensee system 108, wherein the indication indicates that the second sub-band 904 may be accessed by the licensee system 108. This is shown in FIG. 9C with a dotted link between the LSA/ASA BS 110 and the licensee system device 109. In this manner the LSA/ASA spectrum becomes efficiently used by the two systems 104 and 108.

As explained, the proposed embodiments may efficiently ensure interference-free operation to incumbent system 104 even in case of dynamic, ad-hoc type of spectrum usage by the incumbent system 104. This may be ensured by the LSA/ASA base station 110 performing continuous spectrum measurements and analysis of the LSA/ASA spectrum usage by the incumbent system 104, which is different than the licensee system 108 under which the LSA/ASA BS 110 operates.

Figure 6:
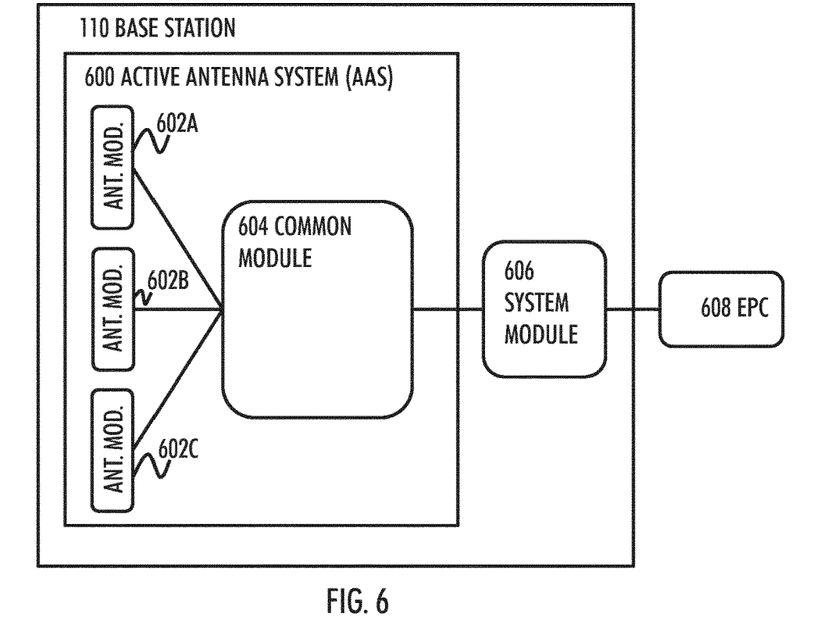
FIG. 6 illustrates an active antenna system, according to an embodiment.

The antenna sensing information needed to perform the proposed embodiments may, in an embodiment, be obtained by using passive antennas of the base station 110 to collect the information from the directions to which the passive antennas are oriented. However, to more efficiently perform the allocation and de-allocation of the LSA/ASA spectrum in a way that minimizes the size of exclusion zones, maximizes the spectrum available to the licensee system 108 and avoids interference to the incumbent system 104, an active antenna system (AAS) 600 is proposed to be used in the base station 110, as shown in the embodiment of FIG. 6.

The AAS comprises radio frequency components (RF), such as power amplifiers and transceivers, integrated with the antenna elements of the base station 110. Conventionally such RF components are part of the base station 110, not part of the antenna coupled to the base station 110. This may enable the phase and amplitude of the signals from each radiating element inside the antenna to be electronically controlled, using signal processing to shape and steer the direction of the radiated beam vertically and horizontally. Benefits of the AAS may include more flexible deployment, improved capacity and coverage, smaller installation and lower power consumption, while also supporting a multi-technology network. The active antenna systems 600 may boost site efficiency and performance of an existing BS. Further, the AAS 600 may be used to create micro and macro cells simultaneously by using the same hardware located at the base station 110.

Although passive antennas with mechanical tilts may be used, more accurate and fast-responsive control of the radiation pattern may be achieved by the AAS 600 in which one or a few radiating elements are individually controlled by the RF components of a corresponding antenna module 602A, 602B, 602C. These antenna modules 602A, 602B, 602C may comprise RF elements needed for controlling the radiation characteristics of the corresponding antenna module 602A, 602B, 602C. One module 602A, 602B, 602C may comprise one or more antenna (radiating) elements. Such technique employed in the AAS 600 may provide more control over coverage and capacity than techniques employing remote radio heads (RRH) or integrated antenna systems (IAS) in which all the radiating elements are fed by a single, common RF component.

In an embodiment, the antenna modules 602A, 602B, 602C (commonly denoted with reference numeral 602) may be coupled to a common module (CM) 604 which combines the information provided from all of the antenna modules 602 and instructs each of the antenna modules 602. The common module 604 may be coupled to the base station 110 via a system module 606. The system module 606 may then connect the base station 110 to the evolved packet core (EPC) 608 and, further, to the Internet.

One of the main advantages of the active antenna systems 600 is their ability to create and steer beams within the cell. Beamforming works by changing the phase and relative amplitude of the signal emitted from each radiating element, so as to create constructive or destructive interference. Constructive interference may be used to amplify the beam in a given direction, while destructive interference may be used to focus the beam, enabling it to be steered more precisely. Beamforming may be applied to radiating and receiving antenna elements independently.

Unlike conventional non-active antennas that are able to tilt all carriers at once, a carrier-specific and separate RX/TX tilting enable by the AAS 600 may provide different carriers to be used to meet different demand scenarios. Similar to carrier-specific tilting, in system specific tilting, active antennas may independently control the tilt of different technologies using the same frequency, for example GSM and WCDMA at 900 MHz or GSM and LTE at 1800 MHz. Moreover, in multi-operator network, an active antenna system 600 may be used to share transmission power between operators using the same antenna. Signals for different operators can be tilted and resources allocated independently to meet the needs of each operator according to subscriber density or other parameter. Operators may thus automatically adjust the sizes and positions of the cells to better serve the non-uniform demand from users across the macro-sector area.

Figure 7A:
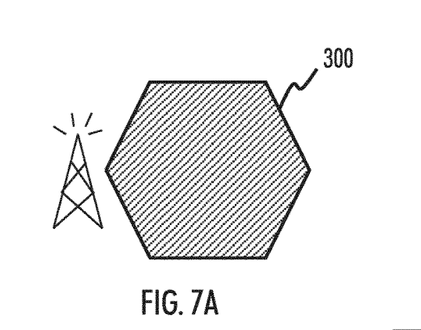
FIG. 7A shows a coverage area of the base station without beamforming.
Figure 7B:
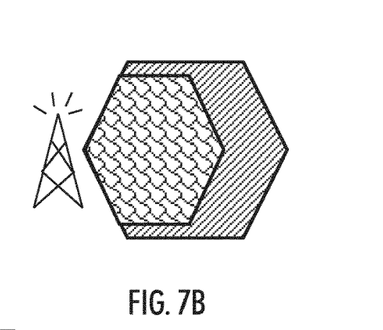
FIGS. 7B and 7C illustrate some embodiments on how beamforming may be used.
Figure 7C:
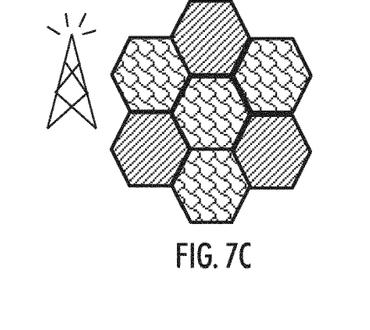

FIG. 7A shows how the whole cell 300 may be influenced with each transmitted signal from the base station 110 in case no beamforming is applied. However, FIGS. 7B and 7C show some examples on how the beams may be steered. In FIG. 7B vertical tilt may be achieved by using the AAS 600 so that only a part of the cell is affected with the signal sent by those antennas that employ the steering of the radio beam. This is shown with two differently marked areas within the cell 300 in FIG. 7B. These areas may be considered to represent signals from different operators using the same antenna, or to represent signals related to different radio access technologies, for example. As such, the dynamic steering of the beam enables distributing capacity precisely to where users need it when they need it.

FIG. 7C, on the other hand, shows how the active antenna system 600 may be further improved through the use of Self-Organizing Networks (SON) solutions. SON may enable the optimization of active antenna parameters according to actual traffic mix, traffic location and user demands. This may enable automated user-tracking beamforming in which the beam follows the user and allocates resources to provide the best customer experience for each user at all times.

Thus, the LSA/ASA solutions may be further improved through utilizing the AAS 600 for collecting the antenna sensing information by RF monitoring and interference detection of the LSA/ASA band. The antenna sensing information collected by the AAS 600 may be more accurate than the information collected by passive antennas because the antenna elements of the AAS 600 may be electrically controlled. Then, phase, delay and/or amplitude information of the received signals may be provided along the antenna sensing information. This measured antenna sensing information related to the incumbent 104 may be used for restriction area/guard band calculation in addition to static exclusion zone tables in the LSA/ASA repository 100 and in the LSA/ASA controller 102.

The active antenna system 600 may be based on idea that each radio in the AAS 600 system is calibrated such that phase, delay and amplitude of the corresponding RX radio are known. In an embodiment, using this knowledge and knowing AAS antenna geometry, it may be possible to create independent beams which can be directed to whatever direction. Creation of the beams may be done in one common beam-forming function in the common module 604.

This collection of antenna sensing information by the AAS 600 may take place by the RX radios and antennas sensing the LSA/ASA spectrum by listening to in-band and/or out-of-normal operating band activity in the coverage area of the base station 110. In an embodiment, the common module 604 (or another network apparatus) may then combine the sensing data to detect whether there is incumbent system 104 activity in the coverage area or not and in which direction (i.e. in which angular sector 302). In other words, the common module 604 may measure, synchronise and phase the sensing data such that an accurate direction of the incumbent 105 within the cell may be detected, as shown in FIG. 3B. In an embodiment, the common module 604 may send the analysed spectrum information to the LSA/ASA controller 604.

This sensing by the AAS 600 may take place in different manners. In an embodiment the incumbent 105 is in the AAS RX band, i.e. operating on the band which the AAS 600 uses for receiving signals from the licensee users 109. In such embodiment, the interference from the incumbent user 105 may be collected using the existing RX radios of the AAS 600 (marked as RX in FIGS. 8A and 8B). As a plurality of RX antennas are used, the accurate direction (angular sector 302) of the incumbent 105 may be calculated by use of the beamforming technique, as explained earlier.

However, in an embodiment, the incumbent 105 is operating in the AAS TX band or out-of-band of the AAS operation. In such case, the AAS 600 may be configured to use an RF filter by-pass coupler (e.g. a switch) to detect the interferer (i.e. the incumbent system user) which might normally go undetected in such scenario. There are different solutions for the detection of the out-of-band interferer 105.

Figure 8A:
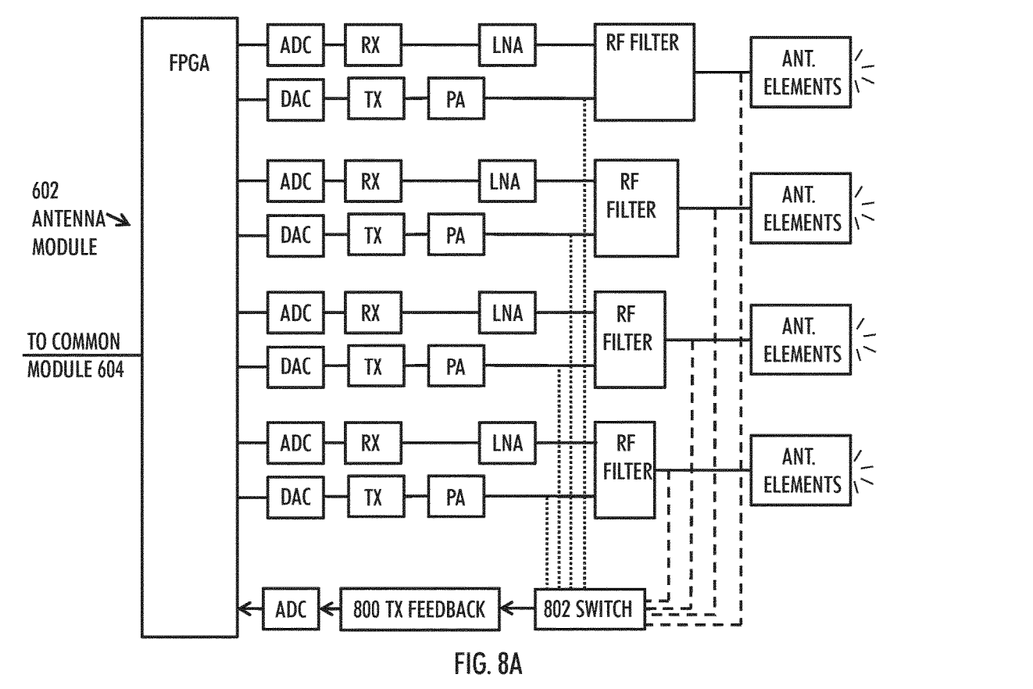
FIGS. 8A and 8B show some embodiments of an antenna module of the active antenna system.

FIG. 8A shows an embodiment in which there are less free RX radios or TX feedback circuits than there are antenna elements. The term "free RX radios" denotes other RX radios than the conventional RX radios of the AAS 600. FIG. 8A shows that there is only one TX feedback unit 800 but there are four antenna groups (marked as "ant. elements"—block in FIGS. 8A and 8B) in this antenna module 602 (e.g. the antenna module 602A). Each antenna group may comprise one or more antenna elements (such as at least one antenna element for the TX and at least one antennas element for the RX). Each antenna group may be coupled with a respective transmit (TX) feed line and reception (RX) line. The TX feed line may comprise a digital-to-analog converter (DAC) and a power amplifier (PA), for example. Each RX line may comprise an analog-to-digital converter (ADC) and a low noise amplifier (LNA). Further a radio frequency by-pass filter (RF filter) may be coupled to the TX and RX lines. The antenna groups may be controlled by the common module 604 via a field-programmable gate array (FPGA). The antenna module may comprise more elements and units, as known by a skilled person, although not shown in FIGS. 8A and 8B.

In the embodiment of FIG. 8A, active beam-forming for detecting the incumbent 105 may not possible due to the lack of a plurality of extra RX radios or TX feedback units. Nevertheless, in an embodiment the separate RX radio or, as in the case of FIG. 8A, the TX feedback unit 800 may be reconfigured to collect the antenna sensing information. In an embodiment, the TX feedback unit 800 is a transmission (TX) pre-distortion feedback unit. Typically the TX feedback unit 800 collects periodic information of the signals that are to be transmitted, as shown with dotted lines in FIGS. 8A and 8B. However, by using a switch 802 the TX feedback unit 800 may be configured to instead receive signals detected by the RX antennas of the AAS antenna module 602, as shown with dashed lines in FIG. 8A. This way the TX feed-back unit 800 may be able to collect the antenna sensing information, also from out-of-normal operating band, as well as from the normal operating band. The collected antenna sensing information may provide an indication of whether or not an incumbent 105 is detected in the coverage area of the base station 110. However, in this embodiment the location of the incumbent 105 may be detected at a cell-accuracy, as in FIG. 3A.

In an embodiment the detection may take place when the AAS 600 is already in an operational stage. This may be performed so that the TX DPD feedback unit 800, or alternatively a separate RX radio, may be configured to listen to the LSA/ASA band at the same time that the AAS 600 is operating in another band. The RX antenna elements of the base station may have a large frequency range (wide-band antennas) so that the RX antennas may detect also signals on the out-of-current operating band.

Figure 8B:
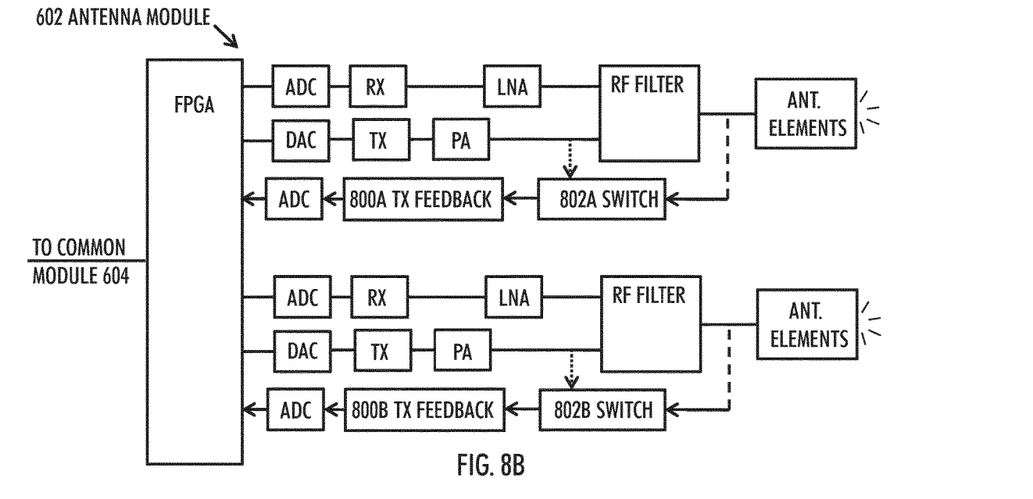

In another embodiment, as shown in FIG. 8B, there are as many TX Digital Pre-distortion (DPD) feedback radios, or alternatively separate RX radios, as there are antenna groups. Otherwise the system is similar to what is shown in FIG. 8A. However, for illustrative purposes there are only two antenna groups and likewise two TX feedback units 800A, 800B. Consequently, an accurate direction of arrival (DoA) of the interfering signal from the incumbent user 105 may be determined. In this way, the angular sector 302 may be accurately determined, as in FIG. 3B. The collection of the antenna sensing information with the plurality of TX feedback units 800A, 800B may be enabled by using respective switches 802A, 802B so as to enable the TX feedback units 800A, 800B to receive information on signals received by the RX antennas of the AAS, as shown with dashed lines in FIG. 8B.

The configuration of FIG. 8B may enable synchronized, concurrent sampling of the LSA/ASA spectrum. With concurrent sampling it may be possible to accurately calculate the direction of the received spectrum. This calculation may be performed in the common module 604 which may collect concurrent samples also from all other antenna modules 602B, 602C within the AAS 600. Alternatively, the collected antenna sensing data from all antenna modules 602A-602C may be transmitted to another network apparatus which performs the combination/calculation.

The TX feedback unit 800, 800A, 800B may be used for sampling the RX spectrum data because the TX feedback unit 800, 800A, 800B needs not sample the TX data all the time (but only periodically). In an embodiment, the switch (es) 802, 802A, 802B may be used to determine the time instants when sampling is to be performed for the RX data and when sampling is to be performed for the TX data. The embodiments shown in FIGS. 8A and 8B may comprise control elements for the switches 800, 800A, 800B, although not shown for simplicity reasons.

In an embodiment, the AAS 600 may comprise extra RX radios, like interference cancellation radios. In this embodiment, these RX radios may be used for collecting the antenna sensing information, instead of the TX feedback units 802, 802A, 802B.

The embodiment of FIG. 8B, as well as the embodiment of FIG. 8A, may be configured to collect the sensing information with respect the normal operating band of the AAS 600 (in-band), or with respect to the TX band of the AAS 600, or with respect to out-of-normal operating band of the AAS 600 (out-of-band), as the case may be. In this way, these embodiments may also assist in a frequency selection process by detecting spectrum usage of out-of-normal operating band of the AAS 600. For example, it may be detected that no incumbent users 105 are present on certain LSA/ASA sub-band. In such case, the network apparatus may indicate to the licensee system 108 that this sub-band is available for the users 109 of the licensee 108.

In an embodiment, the base station 110 is configured to periodically collect antenna sensing information with respect to the out-of-normal operating band of the base station 110. In an embodiment, out-of-normal operating band of the base station 110 denotes out-of-current RX reception band. Nevertheless, this may be performed with the conventional RX antennas located in the antenna groups (marked as "ant. elements"—blocks in FIGS. 8A and 8B). There conventional RX antennas may be wide-band antennas so that they are able listen to signals on the in-band and also on the out-of-current band. The TC feedback unit 802, 802A, 802B, or alternatively a separate, extra RX radio, may be configured to receive these RX signals detected by the conventional, wide-band RX antennas. This may be advantageous so that information is obtained at least periodically on whether or not the LSA/ASA band is free to be accessed by the licensee system 108, or whether the LSA/ASA band is used by the incumbent system 104.

The band that is to be sensed by the base station may be selected by the network apparatus, such as the common module 604 or the LSA/ASA controller 102. Commands related to this may go through the OAM of the licensee system 108. In an embodiment, the base station 110 (e.g. the common module 604 of the AAS 600) may then send an alarm if there is interference detected in the sensed band. This may mean that the licensee system is not allowed to access the LSA/ASA spectrum. In an embodiment, an indication of a free LSA/ASA spectrum may likewise be given so that the licensee system knows that the LSA/ASA band may be utilized.

In an embodiment, the AAS 600 uses the LSA/ASA band for cellular operation. In an embodiment, the base station may detect non-expected interference rise on a given band and, consequently, the network apparatus may consequently alarm, through the OAM, the LSA/ASA controller 102 and the LSA/ASA repository 100 that there likely is an incumbent user 104 in that band. In an embodiment, the base station may determine the angular sector in which the incumbent 105 is located with respect to the base station. In an embodiment, the network apparatus may also check whether the interference rise takes place during the licensee system 108 is having an idle period so as to ensure that the interference rise is not due to the activities of the licensee users 109.

In an embodiment, the overall process for collecting the antenna sensing information takes place so that first the TX feedback unit 800 is configured to the LSA/ASA band. This configuration may be controlled by the common module 604 of the AAS 600. The switch 802 may then be applied to by-pass the RF filter of FIGS. 8A and 8B. Thereafter, the TX feedback unit/radio 800 may be used to collect the antenna sensing data inside and/or outside of the operating band. This antenna sensing information may then be send to the common module 604 along with timing information of the detected signals. In case the interfering signal is at a low level (e.g. lower than a predetermined threshold, which may be empirically derived), then the common module 604 may in an embodiment stop its own TX operation for the sensing period. In one embodiment, the accuracy of the measurement (see FIG. 8A) corresponds to one cell. In another embodiment, the accuracy corresponds to the applied antenna radiation/reception pattern. However, in case more accurate location of the incumbent 105 is needed and the AAS 600 comprises multiple TX feedback units 800A, 800B, or RX radios, then these may be used and more accurate location of the interfere 105 may be determined. In an embodiment, the measurements may be concurrent from multiple RX antennas.

Let us take an overall view on how the LSA/ASA may be implemented together with the AAS. The procedure may start by the MNO 108 assessing the balance between demand/current network load and existing spectrum resources. This may include estimating the business potential from sharing of spectrum from others. In case the MNO decides to apply the LSA/ASA spectrum, then the MNO 108 may define and agree rules and conditions with the regulator 106 and the incumbent 104. As a consequence, the MNO 108 and the regulator 106 may establish a licensing agreement. The LSA/ASA may be deployed then by the MNO 108 obtaining knowledge of the available parts of the LSA/ASA band and usage conditions in the given area from the LSA/ASA repository database 100. After this the MNO 108 may perform network planning for the LSA/ASA band. The MNO 108 may deploy a network that supports the LSA/ASA band.

Thereafter, the MNO, or more specifically the OAM, may report to the LSA/ASA repository 100 which parts of the LSA/ASA band it starts to use. The LSA/ASA controller 100 and the MNO 108 may then configure the base station(s) 110 to the allowed parts of the LSA/ASA band. The beamforming functionality of the AAS 600 may then be configured on the basis of the allowed geographical parts where the licensee system 108 applies. The MNO 108 may further apply measures for changing its users 109 to the allowed parts of the LSA/ASA band from its other networks. With optional AAS RF monitoring and interference measurements, the MNO 108 may balance capacity demand and supply between different networks.

At a given point the licensee user 108 may need to evacuate the LSA/ASA band (on the basis of static rules or dynamic antenna sensing information). Consequently, the base station 110 may stop transmissions on parts of the LSA/ASA band, if the regulator 106 or the incumbent 104 so requests, or if the duration of licensing agreement expires. Then the AAS 600 may be configured to control the antenna beams to evacuate the LSA/ASA band in those locations where requested by the incumbent 104, for example. The LSA/ASA repository 100 may be indicated accordingly so as to let the incumbent system 104 know that the LSA/ASA spectrum is free of licensee users 109.

Figure 10:
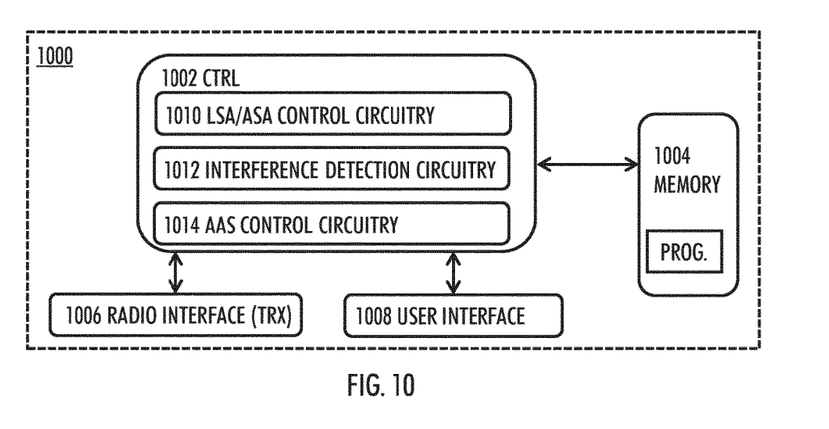
FIG. 10 illustrates a network apparatus according to an embodiment.

An embodiment, as shown in FIG. 10, provides an apparatus 1000 comprising a control circuitry (CTRL) 1002, such as at least one processor, and at least one memory 1004 including a computer program code (PROG), wherein the at least one memory 1004 and the computer program code (PROG), are configured, with the at least one processor 1002, to cause the apparatus 1000 to carry out any one of the described processes. The memory 1004 may be implemented using any suitable data storage technology, such as semiconductor based memory devices, flash memory, magnetic memory devices and systems, optical memory devices and systems, fixed memory and removable memory.

In an embodiment, the apparatus 1000 may be or be comprised in a base station (also called a base transceiver station, a Node B, a radio network controller, or an evolved Node B, for example). In an embodiment the apparatus 1000 is comprised in the eNB 110. In an embodiment, the apparatus 1000 is or is comprised in the LSA/ASA controller 102. In an embodiment, the apparatus 1000 is or is comprised in the common module 604. In an embodiment, the apparatus 1000 is or is comprised in another network element capable of controlling the operation of the base station 110. The actual physical location of the network apparatus 1000 may be implementation specific issue. A skilled person understands that the apparatus 1000 may locate in various locations of the network.

The apparatus 1000 may further comprise communication interface (TRX) 1006 comprising hardware and/or software for realizing communication connectivity according to one or more communication protocols. The TRX 1006 may provide the apparatus 1000 with communication capabilities to control the base station 110, to access the radio access network, to communicate with the LSA/ASA system, depending on the physical location of the apparatus, for example.

The apparatus 1000 may also comprise a user interface 1008 comprising, for example, at least one keypad, a microphone, a touch display, a display, a speaker, etc. The user interface 1008 may be used to control the apparatus 1000 by the user.

The control circuitry 1002 may comprise a LSA/ASA control circuitry 1010 for controlling whether the licensee system users are allowed to access the LSA/ASA spectrum. The LSA/ASA control circuitry 1010 may thus take care of the entry and evacuation of the LSA/ASA spectrum.

An interference detection circuitry 1012 may be responsible of triggering and configuring the collection of the antenna sensing information and analysing the information in order to detect whether incumbent system user is active in the area. Further, the accurate location of the incumbent system user may be determined by this circuitry.

An AAS control circuitry 1014 may be responsible for controlling, configuring and operating the AAS 600 of the base station, in case the base station comprises the AAS 600. The task of the circuitry 1014 may comprise handling the beamforming of the AAS 600, for example.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
   obtaining, by a network apparatus, antenna sensing information with respect to signals received by a base station operating under a shared access-system which allows a licensee system to apply at least a part of a shared access spectrum which is currently unused by an incumbent system;
   detecting, on the basis of the antenna sensing information, that at least one device of the incumbent system is communicating on the shared access spectrum in the coverage area of the base station;
   identifying the angular sector in which the device of the incumbent system is located with respect to the base station;
   dynamically isolating the identified angular sector from usage by the licensee system, by performing at least the following:
   identifying the angular sector within a cell of the base station on a basis of phase information comprised in the antenna sensing information, wherein the phase information indicates a phase of the received signal with respect to a plurality of antenna elements of the base station, wherein the identified angular sector is defined horizontally and vertically as a part of the cell of the base station; and
   dynamically isolating only the identified angular sector that defines the part of the cell from usage by the licensee system, thereby restraining from shutting the entire cell of the base station from the licensee system.

2. The method of claim 1, further comprising:
   identifying the angular sector on the basis of physical orientation information of each antenna group of the base station, wherein the antenna sensing information comprises antenna group-specific information and the identified angular sector correspond to a cell of the base station.

3. The method of claim 1, further comprising:
   detecting, on the basis of the antenna sensing information, at least one characteristic of a received signal; and
   detecting, on the basis of the detected at least one characteristic, that the received signal is transmitted by a device of the incumbent system.

4. The method of claim 1, further comprising:
   detecting that the base station is communicating with at least one device of the licensee system on the shared access spectrum in the identified angular sector; and
   causing the base station to cease the communication with the at least one device of the licensee system on the shared access spectrum in the identified angular sector in order to protect the incumbent system from interference.

5. The method of claim 1, further comprising:
   detecting that a device of the licensee system is requesting an access to the shared access spectrum from the identified angular sector; and
   preventing the device of the licensee system from accessing the shared access spectrum from the identified angular sector.

6. The method of claim 1, wherein the base station comprises an active antenna system including radio frequency components integrated with the antenna elements of the base station so that the phase and amplitude of signals to/from each antenna element of the active antenna system is electronically controllable.

7. The method of claim 1, wherein the base station comprises at least one transmission pre-distortion feedback unit, the method further comprising:
   reconfiguring the base station to apply the at least one transmission pre-distortion feedback unit in collecting the antenna sensing information with respect to the signals received by the base station.

8. The method of claim 7, further comprising:
   reconfiguring the base station to apply the at least one transmission pre-distortion feedback unit in collecting the antenna sensing information on an out-of-current reception band of the base station.

9. The method of claim 1, wherein the shared access-technique is according to the Licensed Shared Access/Authorised Shared Access, LSA/ASA.

10. A method, comprising:
    obtaining, by a network apparatus, antenna sensing information with respect to signals received by a base station operating under a shared access-system which allows a licensee system to apply at least a part of a shared access spectrum which is currently unused by an incumbent system;
    detecting, on the basis of the antenna sensing information, that at least one device of the incumbent system is communicating on the shared access spectrum in the coverage area of the base station;
    identifying the angular sector in which the device of the incumbent system is located with respect to the base station;

dynamically isolating the identified angular sector from usage by the licensee system, wherein the base station is performing communication on a first sub-band of the shared access spectrum;
configuring the base station to collect the antenna sensing information with respect to a second sub-band of the shared access spectrum; and
acquiring the antenna sensing information with respect to the second sub-band which is different than the first sub-band.

11. The method of claim 10, further comprising:
detecting, on the basis of the antenna sensing information of the second sub-band, that the second sub-band is not used by the incumbent system; and
deciding to transmit an indication to the licensee system, wherein the indication indicates that the second sub-band may be accessed by the licensee system.

12. The method of claim 10, further comprising:
detecting, on the basis of the antenna sensing information, at least one characteristic of a received signal; and
detecting, on the basis of the detected at least one characteristic, that the received signal is transmitted by a device of the incumbent system.

13. The method of claim 10, further comprising:
detecting that the base station is communicating with at least one device of the licensee system on the shared access spectrum in the identified angular sector; and
causing the base station to cease the communication with the at least one device of the licensee system on the shared access spectrum in the identified angular sector in order to protect the incumbent system from interference.

14. The method of claim 10, further comprising:
detecting that a device of the licensee system is requesting an access to the shared access spectrum from the identified angular sector; and
preventing the device of the licensee system from accessing the shared access spectrum from the identified angular sector.

15. The method of claim 10, wherein the base station comprises an active antenna system including radio frequency components integrated with the antenna elements of the base station so that the phase and amplitude of signals to/from each antenna element of the active antenna system is electronically controllable.

16. The method of claim 10, wherein the base station comprises at least one transmission pre-distortion feedback unit, the method further comprising:
reconfiguring the base station to apply the at least one transmission pre-distortion feedback unit in collecting the antenna sensing information with respect to the signals received by the base station.

17. An apparatus, comprising:
at least one processor; and
at least one memory including computer program code,
the at least one memory and the computer program code configured, with the at least one processor, to cause the apparatus to perform at least the following:
obtaining, by a network apparatus, antenna sensing information with respect to signals received by a base station operating under a shared access-system which allows a licensee system to apply at least a part of a shared access spectrum which is currently unused by an incumbent system;
detecting, on the basis of the antenna sensing information, that at least one device of the incumbent system is communicating on the shared access spectrum in the coverage area of the base station;
identifying the angular sector in which the device of the incumbent system is located with respect to the base station;
dynamically isolating the identified angular sector from usage by the licensee system, by performing at least the following:
identifying the angular sector within a cell of the base station on the basis of phase information comprised in the antenna sensing information, wherein the phase information indicates a phase of the received signal with respect to a plurality of antenna elements of the base station, wherein the identified angular sector is defined horizontally and vertically as a part of the cell of the base station; and
dynamically isolating only the identified angular sector that defines the part of the cell from usage by the licensee system, thereby restraining from shutting the entire cell of the base station from the licensee system.

18. A computer program product embodied on a non-transitory distribution medium readable by a computer and comprising program instructions which, when loaded into an apparatus, causes the apparatus to execute the method according to claim 1.

19. A computer program product embodied on a non-transitory distribution medium readable by a computer and comprising program instructions which, when loaded into an apparatus, causes the apparatus to execute the method according to claim 10.

20. An apparatus, comprising:
at least one processor; and
at least one memory including computer program code,
the at least one memory and the computer program code configured, with the at least one processor, to cause the apparatus to perform at least the following:
obtaining, by a network apparatus, antenna sensing information with respect to signals received by a base station operating under a shared access-system which allows a licensee system to apply at least a part of a shared access spectrum which is currently unused by an incumbent system;
detecting, on the basis of the antenna sensing information, that at least one device of the incumbent system is communicating on the shared access spectrum in the coverage area of the base station;
identifying the angular sector in which the device of the incumbent system is located with respect to the base station;
dynamically isolating the identified angular sector from usage by the licensee system, wherein the base station is performing communication on a first sub-band of the shared access spectrum;
configuring the base station to collect the antenna sensing information with respect to a second sub-band of the shared access spectrum; and
acquiring the antenna sensing information with respect to the second sub-band which is different than the first sub-band.

* * * * *